June 17, 1958 — T. D. PRICE ET AL — 2,839,358
PROCESS OF RECOVERING URANIUM
Filed Nov. 30, 1944
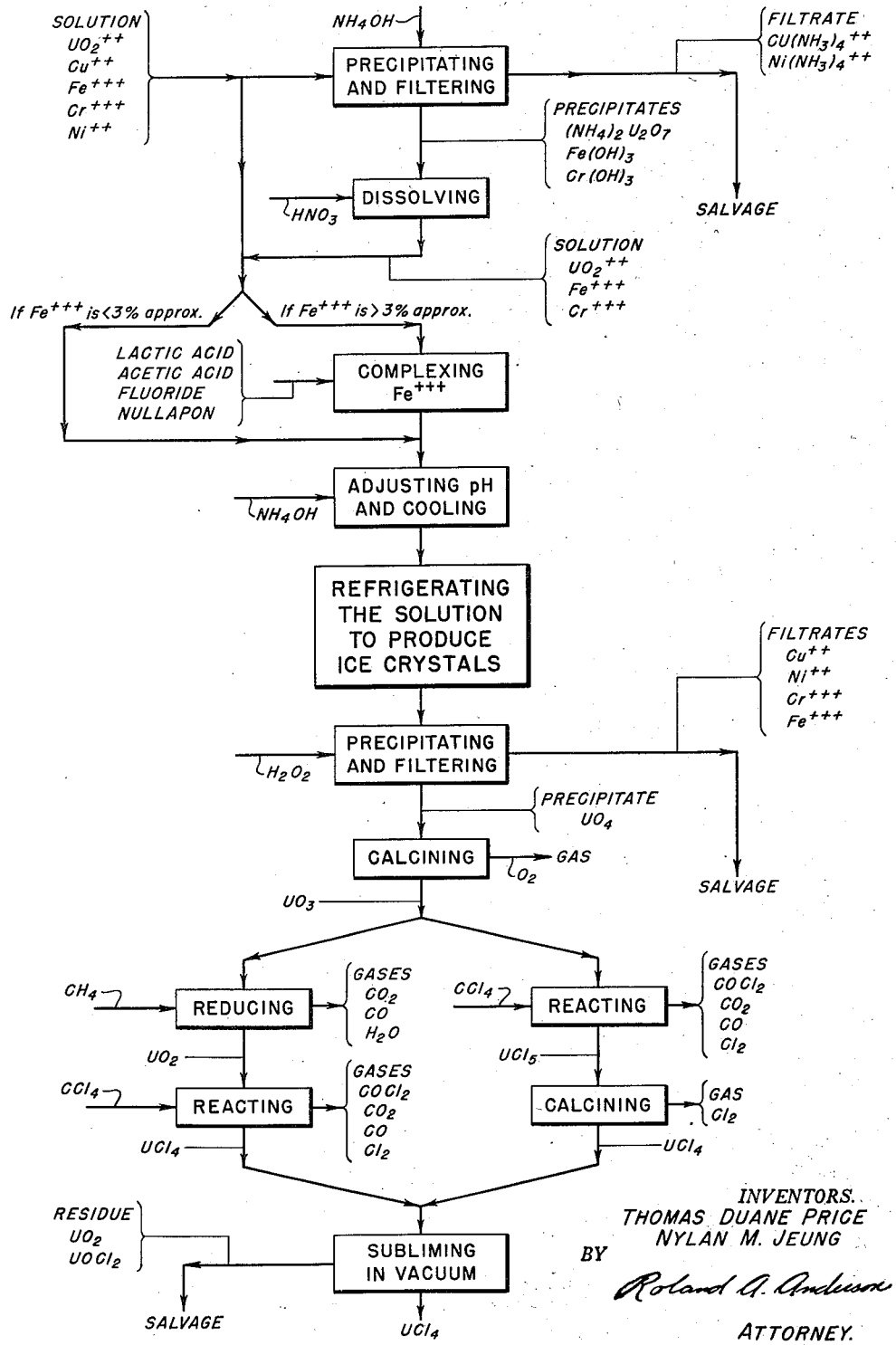
INVENTORS.
THOMAS DUANE PRICE
NYLAN M. JEUNG
BY
ATTORNEY.

United States Patent Office 2,839,358
Patented June 17, 1958

2,839,358

PROCESS OF RECOVERING URANIUM

Thomas Duane Price, Oak Ridge, Tenn., and Nylan M. Jeung, Berkeley, Calif., assignors to the United States of America as represented by the United States Atomic Energy Commission Application November 30, 1944, Serial No. 565,997

11 Claims. (Cl. 23—14.5)

This invention relates to the recovery of uranium, and more particularly to improved processes that are especially adapted for use in conjunction with the separation of uranium from solutions.

The uses of uranium now developed, and the chemical research being done on such radioactive materials has made necessary a relatively inexpensive method for reclaiming and separating uranium from solutions.

The operation of mass spectrometers, of isotope separators, and other related apparatus, has created a need for a chemical process to recover the highly valued uranium metal and compounds from such devices. It is customary to wash the parts of such apparatus with water, or with acid solutions in order to provide solutions for a recover of the uranium. Solutions containing uranium are also found in ore processing reactions and the demand and price of uranium is such as to make worthwhile its recovery from such waste liquors. As the future demand for uranium increases, the problem of recovery may be expected to assume greater importance. Accordingly, a process such as disclosed can be used to recover such uranium from solutions even where impurities are present.

Accordingly, it is an object of the invention to provide an improved process of reclaiming uranium from solutions thereof.

Another object of the invention is to provide an improved process for recovering uranium from solutions that may be readily carried out on a commercial scale and in an economical manner.

Another object of the invention is to provide a process of reclaiming uranium from a solution in which the uranium is precipitated away from metal impurities in the solution.

A further object of the invention is to provide a process of reclaiming uranium from a solution in which the uranium is precipitated as uranium peroxide away from metal impurities in the solution, said precipitation being enhanced by the presence of minute ice crystals.

Still another object of the invention is to provide a process of reclaiming uranium from solutions in which the uranium is substantially completely precipitated as uranium peroxide away from metal impurities in the solution by addition of hydrogen peroxide and sub-freezing thermal control.

The invention, both as to its organization and method of operation, together with further objects and advantages thereof, will best be understood by reference to the following specification taken in connection with the accompanying drawing, which illustrates the flow diagram of the present process.

Considering now the details of the purification of solutions described above, comprising the following ions: $UO_2^{++}$, $Cu^{++}$, $Fe^{+++}$, $Cr^{+++}$, and $Ni^{++}$, reference is made to the flow diagram illustrated in the drawing. In the event that the solution contains a reasonably large amount of copper and nickel, the solution is subjected to a preliminary ammonia treatment in order to eliminate a majority, if not substantially all, of the impurities mentioned; otherwise this step is omitted. Assuming that the ammonia treatment is to be employed, the solution is treated either with excess $NH_3$ gas or carbonate-free $NH_4OH$, whereby $(NH_4)_2U_2O_7$, $Fe(OH)_3$ and $Cr(OH)_3$ are precipitated away from most of the copper and nickel in solution in the form of ammonia complex ions, $Cu(NH_3)_4^{++}$ and $Ni(NH_3)_4^{++}$. The solution is then filtered and the precipitate, consisting of ammonium diuranate, ferric hydroxide and chromic hydroxide, is washed with water containing about 1% $NH_4OH$ and 1% $NH_4NO_3$ in order to eliminate occluded copper and nickel ammonia complex ions. The filtrate containing the copper and nickel ammonia complex ions is then discarded or subjected to salvage treatment in order to recover any uranium contained; and the initially purified precipitate of $(NH_4)_2U_2O_7$, $Fe(OH)_3$ and $Cr(OH)_3$ is dissolved in dilute $HNO_3$, whereby a solution is obtained containing the following ions: $UO_2^{++}$, $Fe^{+++}$ and $Cr^{+++}$.

The original composite solution, or the solution obtained after the preliminary ammonia treatment described above, is then analyzed in order to determine the ferric ion content thereof. In the event it is determined that the $Fe^{+++}$ ion content of the solution mentioned is greater than approximately 3% the ferric ion in the solution is complexed by the introduction of an agent which forms complex ion with ferric ion; on the other hand, in the event it is determined that the $Fe^{+++}$ contained is less than approximately 3%, the last mentioned treatment is omitted. Assuming that the solution contains greater than approximately 3% $Fe^{+++}$ ion, this ion is complexed by the addition to the solution of an appropriate agent such as lactic acid, acetic acid, fluoride ion, or "Nullapon," which last-mentioned substance is understood to be the tetrasodium salt of ethylene diamine tetracetic acid having the formula $$[CH_2N(CH_2COONa)_2]_2$$

The addition of the agent mentioned to the solution complexes the ferric ion, thereby eliminating the normal catalytic action of the ferric ion upon $H_2O_2$ and consequently catalytic decomposition of the hydrogen peroxide in the subsequent purification. It will be understood that the presence of an appreciable amount of uncomplexed ferric ion in the solution will affect catalytic decomposition of hydrogen peroxide, thereby preventing complete precipitation of uranium peroxide, as explained more fully below.

Now assuming that a solution is obtained that contains $UO_2^{++}$, $Cu^{++}$, $Ni^{++}$, $Cr^{+++}$, and $Fe^{+++}$ ions, which is conditioned for purification by the hydrogen peroxide precipitation step, this solution may be an original solution or a solution which has been derived after preliminary ammonia treatment, as explained above; either of which solutions may or may not have been treated with the ferric ion complexing agent. In any case, the solution does not contain undue amounts of copper or nickel impurities or uncomplexed ferric ion in an amount greater than approximately 3%. The solution mentioned is fairly acid in view of its derivation and the pH thereof is adjusted within the approximate range 1.0 to 3.0, and preferably within the range 1.5 to 3.0, by the addition of $NH_4OH$ thereto. The acidified solution is then cooled to a temperature below its freezing point and preferably in the range of incipient freezing. The solution is maintained in said temperature range to insure the presence of minute ice crystals, and hydrogen peroxide which may conveniently be in the form of a pre-cooled 30% solution by volume is added to the acidified solution in excess so there is more than enough hydrogen peroxide to precipitate all of the uranium as the peroxide, $UO_4 \cdot 2H_2O$, The maintenance of sub-freezing temperature, as aforementioned, is a prime feature of the present invention resulting in consistent optimum precipitation of the uranium as the peroxide in a minimum period of time. Although a precise explanation of the precipitation phenomena occurring at the sub-freezing temperatures is not available, there is reason to believe that the crystals of frozen solvent, i. e. ice crystals, act as a seeding agent to prevent characteristic supersaturation of the solution with $UO_4 \cdot 2H_2O$.

The preferred temperature range on low impurity solutions for the instant process is in the range of incipient freezing, which is from about −2° C. to −10° C., depending upon the concentration of dissolved substances in the solution. In many instances, particularly in the case of high impurity solutions, it may be found convenient or desirable to operate at lower temperatures, it being understood that the use of freezing as a precipitation aid is the essence of the invention. It is usually desirable to refrigerate the solution to a solid mass at low temperatures such as obtained by Dry Ice baths in such solvents as acetone, ether, alcohol and the like. As an example of such low temperatures, if acetone and Dry Ice are employed, a temperature of about −45° C., will be obtained. The solid mass so obtained may be kept in said state until it is desired to thaw to the range of incipient freezing, whereupon the recovery process may be completed. Thereafter, the solution is filtered and the precipitate is washed with an aqueous solution that is approximately 2% in $NH_4NO_3$ and 3% in $H_2O_2$. The filtrate containing the copper, nickel, chromium and iron impurities is then discarded or subjected to salvage treatment in order to recover any uranium contained and the purified $UO_4 \cdot 2H_2O$ precipitate is calcined to $UO_3$ at approximately 325° C., whereby $O_2$ gas is given off incident to the calcination. The purified uranium in the compound form $UO_3$ is then stored for further treatment or commercial use, as previously noted.

Considering now the details of the ultimate conversion of $UO_3$ to $UCl_4$, reference is made to the drawing. The uranium trioxide may be converted by alternative processes into crude $UCl_4$. In accordance with one process the $UO_3$ is first reduced to $UO_2$ by heating with $CH_4$ at approximately 450° C., whereby $CO_2$, CO gases and water vapor are given off incident to the reduction. The uranium dioxide is then reacted with $CCl_4$ in the vapor phase at approximately 450° C. in a suitable reaction chamber in order to produce crude $UCl_4$, whereby $COCl_2$, $CO_2$, CO and $Cl_2$ gases are given off incident to the reaction. In accordance with an alternative process the $UO_3$ may be reacted directly with $CCl_4$ in the liquid phase in an autoclave at a temperature of approximately 140° to 160° C. and at a pressure of approximately 200 pounds per square inch gauge in order to produce $UCl_5$, whereby $COCl_2$, $CO_2$, CO and $Cl_2$ gases are given off incident to the reaction. The uranium pentachloride thus produced is then calcined or decomposed to produce crude $UCl_4$ by heating to approximately 350° C., whereby $Cl_2$ gas is given off incident to the calcination.

In any case, the crude uranium tetrachloride produced by either of the alternative processes indicated above is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The $UCl_4$ thus produced is of very pure form.

The present process of recovering uranium from solutions is very effective in view of the fact that it is quite versatile. Thus, not only may uranium be reclaimed from a solution containing the impurities mentioned, copper, iron, chromium and nickel, but the solution may contain a variety of other impurities, such as manganese and zinc, without adversely affecting the purification. Moreover, the purification can be carried out as explained without particular reference to the identification of the impurities or the proportions contained in the solution; this feature is very advantageous in view of the fact that both the particular impurities as well as the related quantities thereof vary considerably among the different solutions.

In view of the foregoing it is apparent that there has been provided an improved process of recovering, reclaiming, purifying and converting uranium, both in metallic and compound form.

Also, it will be understood that the present process may be suitably modified so that a compound of uranium other than $UCl_4$ may be treated. For example, the calutron, as well as the conversion steps of the process, may be modified, whereby $UCl_6$, $UBr_4$, etc. may be treated.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of reclaiming uranium from a solution containing heavy metal impurities including iron and copper comprising the steps of adjusting the pH of said solution within the approximate range of 1 to 3, refrigerating the acid solution until ice crystals are formed therein, treating said refrigerated solution with hydrogen peroxide to precipitate the uranium as uranium peroxide away from the heavy metal impurities in the solution, freezing and thawing and then separating the uranium peroxide precipitate so formed from the solution.

2. The process of reclaiming uranium from an acid solution containing a relatively large amount of iron as an impurity comprising refrigerating the solution to cause ice crystals to form therein, treating the solution with cool hydrogen peroxide solution to precipitate the uranium as uranium peroxide away from the iron impurity in the solution, and then separating the uranium peroxide precipitate from the solution.

3. The process of reclaiming uranium from solutions containing the same with impurities comprising adjusting the pH of the solution to render it highly acidic, refrigerating the resulting acid solution to cause the formation of ice crystals therein, treating the refrigerated acid solution with hydrogen peroxide to precipitate the uranium as uranium peroxide away from the metal impurities in the solution, freezing and thawing and then separating the uranium peroxide precipitate from the solution.

4. The process of reclaiming uranium from acid solutions containing the same with metal impurities comprising adjusting the pH of the solution, refrigerating the acid solution to a temperature of −2° C. to −10° C., treating the refrigerated acid solution with cool hydrogen peroxide to precipitate the uranium as uranium peroxide away from the metal impurities in the solution, freezing and thawing and then separating the uranium peroxide precipitate from the solution.

5. The process of reclaiming uranium from solutions containing the same with metal impurities including iron comprising treating the solution with an agent which forms a complex ion with ferric ion, adjusting the pH of the solution within the approximate range of 1 to 3, refrigerating the acid solution to produce ice crystals therein, treating the refrigerated acid solution with hydrogen peroxide to precipitate the uranium as uranium peroxide, freezing and thawing and then separating the uranium peroxide precipitate from the solution.

6. The process of reclaiming uranium from a solution containing uranium and having metal impurities, comprising adjusting the pH of the solution to render it highly acidic, refrigerating the resulting acid solution to cause the formation of ice crystals therein, treating the refrigerated acid solution with cool hydrogen peroxide to precipitate the uranium as uranium peroxide away from the metal impurities in the solution, separating the uranium peroxide precipitate from the solution, and then calcining the uranium peroxide precipitate to produce uranium trioxide.

7. The process of reclaiming uranium from a solution containing uranium and metal impurities of a first class which forms ammonia complex ions soluble in an alkaline solution and metal impurities of a second class which forms hydroxides insoluble in an alkaline solution comprising treating the solution with ammonia to precipitate the uranium and the metal impurities of the second class away from the metal impurities of the first class, separating the precipitate from the solution, dissolving the precipitate in acid, whereby the solution contains uranyl and ferric and chromic ions, adjusting the pH of the solution within the approximate range 1.5 to 3.0, refrigerating the resulting acid solution to cause the formation of ice crystals therein, treating the refrigerated acid solution with hydrogen peroxide to precipitate the uranium as uranium peroxide away from the iron and chromium impurities in the solution, and then separating the uranium peroxide precipitate from the solution.

8. The process of recovering the residue of water-soluble uranium compound from a solution thereof containing metallic impurities comprising adjusting the pH of the solution within the approximate range 1.5 to 3.0, refrigerating the acid solution to cause the formation of ice crystals therein, treating the refrigerated solution containing ice crystals with hydrogen peroxide to precipitate uranium as uranium peroxide away from the metal impurities in the solution, and then separating uranium peroxide away from said solution.

9. The process of recovering the residue of uranium tetrachloride from a solution of uranium tetrachloride containing metallic impurities comprising adjusting the pH of the solution within the approximate range 1.5 to 3.0, refrigerating the acid solution to the range of incipient freezing, treating the refrigerated solution with hydrogen peroxide to precipitate the uranium as uranium peroxide away from the metal impurities in the solution, and then separating the uranium peroxide away from the solution.

10. The process of recovering metallic uranium from an acid solution containing uranium and metal impurities comprising adjusting the pH of the acid solution within the approximate range 1.5 to 3.0, refrigerating the acid solution to the temperature range of incipient freezing, treating the acid solution so refrigerated with hydrogen peroxide to precipitate uranium as uranium peroxide away from metal impurities in the solution, refrigerating the treated solution to solidify said solution, thawing the solidified solution and maintaining a temperature of $-2°$ to $-10°$ C. to allow substantially all of the uranium to precipitate as uranium peroxide, and then separating the uranium peroxide away from the solution.

11. The process of recovering metallic uranium from solutions thereof having metal impurities comprising adjusting the pH of the solution within the approximate range 1.5 to 3.0, refrigerating the acidified solution to cause the formation of ice crystals therein, treating the resulting refrigerated solution with hydrogen peroxide to precipitate the uranium as uranium peroxide away from the metal impurities in the solution, and then separating the uranium peroxide precipitate away from the solution.

References Cited in the file of this patent

Rosenheim et al.: "Uranium Tetroxide Dihydrate," Chemical Abstracts, vol. 23, page 4634 (1929).